United States Patent [19]

Doevenspeck et al.

[11] 4,306,543
[45] Dec. 22, 1981

[54] SOLAR COLLECTOR

[75] Inventors: Robrecht M. L. Doevenspeck; Jan J. B. Fransen, both of Eindhoven, Netherlands

[73] Assignee: U.S. Philips Corporation, New York, N.Y.

[21] Appl. No.: 58,581

[22] Filed: Jul. 18, 1979

[30] Foreign Application Priority Data

Aug. 25, 1978 [NL] Netherlands .................... 7808774

[51] Int. Cl.³ ............................................. F24J 3/02
[52] U.S. Cl. .................................. 126/433; 126/443; 126/438; 165/104.21
[58] Field of Search .............. 126/433, 443, 434, 438, 126/901; 165/105

[56] References Cited

U.S. PATENT DOCUMENTS

| 4,119,085 | 10/1978 | Knowles et al. | 126/433 |
| 4,142,509 | 3/1979 | Hermann et al. | 126/443 |
| 4,217,882 | 8/1980 | Feldman, Jr. | 126/438 |

Primary Examiner—Larry I. Schwartz
Attorney, Agent, or Firm—Thomas A. Briody; William J. Streeter; Rolf E. Schneider

[57] ABSTRACT

There is provided a solar collector comprising an absorber, a getter, and a heating element arranged within an evacuated transparent envelope, the heating element being positioned separate and apart from the getter. Associated with the envelope is means to heat the heating element to a temperature of 500° to 2000° C. in order to crack any hydrocarbons formed from gaseous contaminants released by the envelope and the absorber during operation.

6 Claims, 7 Drawing Figures

SOLAR COLLECTOR

This invention relates to a solar collector, comprising an absorber which is arranged inside an evacuated, transparent envelope and which has at least one duct, said absorber serving to transfer heat derived from incident solar radiation to a heat transport medium in said duct during operation, and also including at least one getter which is situated inside the envelope.

A solar collector of the described kind is known from U.S. Pat. No. 4,134,388.

It has been found that the pressure inside the envelope of such known solar collector strongly increases in the course of time, in spite of the presence of a getter such as Ba, Zr, Ti and the like. This pressure increase is accompanied by a drastic reduction of the thermal efficiency of the solar collector, because a substantial part of the heat derived from the incident solar radiation is dissipated to the surroundings by conduction from the absorber to the envelope.

The present invention has for its object to provide an improved solar collector in which a suitable vacuum is maintained in the envelope throughout the service life of the collector.

In order to realize this object, the solar collector in accordance with the invention is characterized in that at least one heating body or element, having an operating temperature of from 500° to 2000° C., is arranged inside the envelope in order to crack residual gases.

The invention is based on the recognition of the fact that gaseous contaminations, such as CO and $H_2O$ released by the absorber and the envelope, can react with the getter to form hydrocarbon compounds, such as methane, which are not bound by the customary getters.

The heating body or element maintained at the comparatively high temperature ensures that such hydrocarbon compounds are cracked, whereby the carbon formed can be taken up by the heating body whilst the hydrogen released is bound by the getter.

A preferred embodiment of the solar collector in accordance with the invention is characterized in that the heating body comprises focussing means which concentrates solar radiation incident during operation onto the heating body in order to heat this body.

The focussing means may consist of, for example, a lens or a reflector or a combination thereof.

The incident solar radiation is thus simply used to raise the operating temperature of the heating body to the desired comparatively high value.

A further preferred embodiment of the solar collector in accordance with the invention is characterized in that the heating body is connected to an electrical current source during operations.

A solar collector installations usually includes an electrical power supply, for example, for control purposes or for driving a heat transport medium pump.

In accordance with the invention, the absorber may be made of a metal and may be connected as a current-carrying element in series with the heating body.

In another preferred embodiment of the solar collector in accordance with the invention, the electrical current source consists of a photovoltaic cell which receives solar radiation during operation.

This is particularly advantageous when solar collectors are used in regions where no public electricity source is available.

The photovoltaic cell is preferably arranged inside the envelope of the solar collector. The cell is thus protected against weather influences and damage.

The invention will now be described in detail with reference to the accompanying drawings, in which:

FIG. 1b is a cross-sectional view taken along the line Ib—Ib of FIG. 1a.

FIG. 1c is a cross-sectional view taken along the line Ic—Ic of FIG. 1a.

FIG. 4b is a cross-sectional view taken along the line IVb—IVb of FIG. 4a.

Figure 1A:
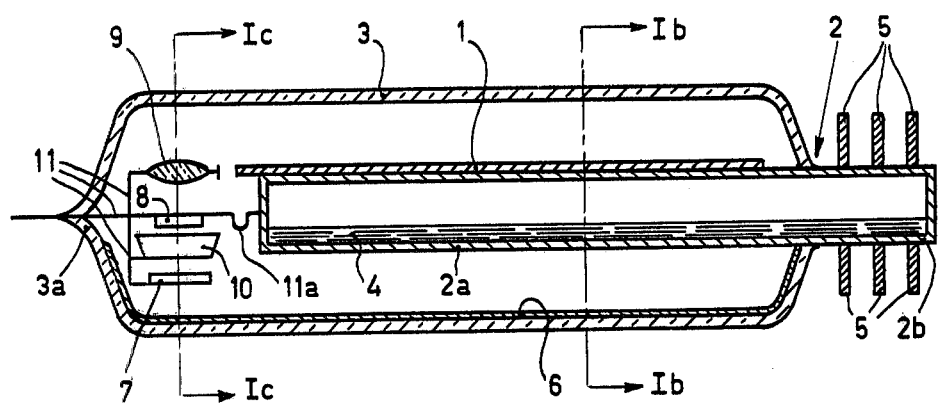
FIG. 1a is a longitudinal sectional view of a heat pipe solar collector, including a heating body in the evacuated envelope; the operating temperature of the heating body is reached by means of incident solar radiation which is focussed by means of a lens and a parabolic trough-shaped reflector.

Reference numeral 1 in FIG. 1a denotes a flat metal absorber which consists of, for example, an aluminium plate which is provided on its upper side with a solar radiation absorbing layer of, for example, nickel oxide or copper oxide, copper sulphide, cobalt oxide or cobalt sulphide (not shown).

A sealed metal tube 2 is connected to the absorber 1, for example, by way of soldering or welding. The tube section 2a which is situated inside the evacuated transparent glass envelope 3 constitutes the evaporator for a heat transport medium 4 in the tube 2 which consists of, for example, water, alcohol or a "Freon". The tube section 2b which is situated outside the glass tube 3 forms a condenser for the heat transport medium 4. The tube section 2b is provided with fins 5 in order to improve the transfer of heat to a heat receiving medium, such as air or water, which is conducted along the tube section 2b during operation.

The lower side of the glass tube 3 is provided with an interior, reflective layer 6 which is formed of, for example, vapour-deposited silver or aluminium.

Inside the evacuated glass tube 3 there are also provided a getter 7, for example, barium, a heating body or element 8 of, for example, kanthal, tungsten, molybdenum or tantalum, a lens 9 and a reflector 10 in the form of a parabolic trough, the heating body 8 being arranged in the focal line thereof.

The components 7 to 10 are supported by a rigid frame construction 11, one end of which is sealed in the end 3a of the glass tube 3, whilst the other end is secured, via an expansion bend 11a, to the metal tube 2. The expansion bend serves for bridging the difference between the thermal expansion of the metal tube 2 and that of the glass envelope 3.

During operation, the condenser 2b is arranged at a level which is higher than that of the evaporator 2a. Heat derived from incident solar radiation causes evaporation of the heat transport medium 4. The resulting vapour flows to the condenser 2b where it condenses while giving off heat. The condensate subsequently returns to the evaporator 2a under the influence of gravity.

The gaseous getter 7 binds the contaminations, such as $O_2$, $H_2$, $H_2O$, CO, $CO_2$, released by the absorber 1, the metal tube 2 and the glass envelope 3.

The heating body 8 has an operating temperature of, for example, 800° C. which is achieved by focussing incident solar radiation thereon by means of the lens 9 and the reflector 10. The heating body 8 ensures that any hydrocarbons, such as $CH_4$, formed inside the glass envelope 3 are cracked, the carbon thus released being taken up, for example, by the heating body, whilst the hydrogen released is bound by the getter 7. A suitable vacuum (for example $10^{-5}$ Torr $\approx 133 \cdot 10^{-5}$ Pa) is thus maintained for the entire service life of the solar collector, so that the high thermal efficiency of the solar collector is maintained.

The glass envelope 3 can alternatively be made of another transparent material, for example, a synthetic material. The metal tube 2 can alternatively be made of, for example, glass, whilst inside the tube 2 there may be provided a capillary structure which provides a gravity-independent return of condensate from the condenser 2b to the evaporator 2a.

Furthermore, the interior of the glass tube 3 may be partly or completely provided with a light-transmitting but infrared-reflective layer of, for example, $In_2O_3$ (not shown) which further increases the thermal efficiency.

Figure 1B:
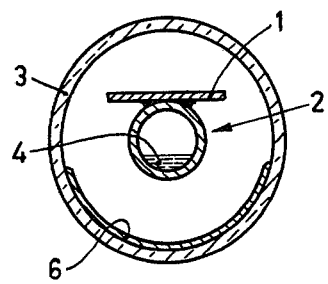
Figure 1C:
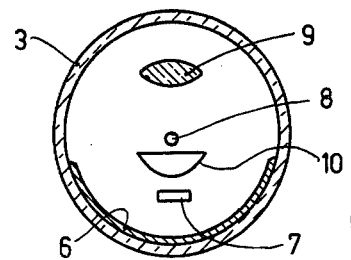

The parts of the solar collectors respectively shown in FIGS. 2 to 4b which correspond to parts of FIGS. 1a to 1c are denoted by the same reference numerals.

Figure 2:
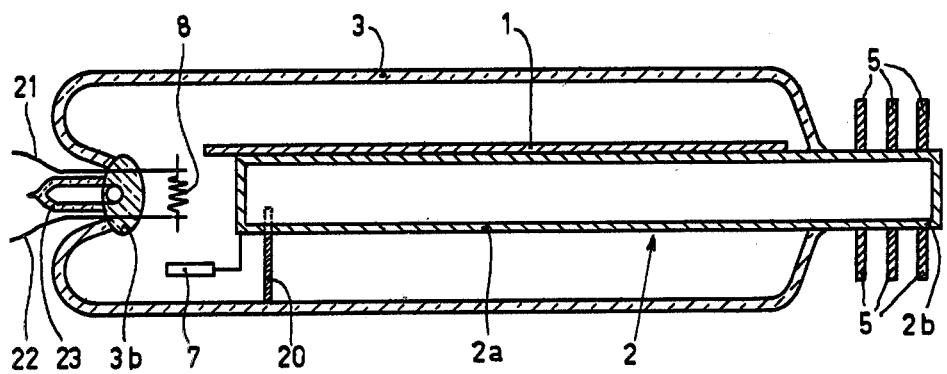
FIG. 2 is a longitudinal sectional view of a heat pipe solar collector which includes a heating body which is powered by an external current source.

The tube 2 of the solar collector shown in FIG. 2 is supported by means of a plate 20. The getter 7 is connected to the tube 2. The heating body or element 8 is connected to an external current source. To this end, leads 21 and 22 are fed out through the glass pinch 3b. Evacuation of the glass tube 3 is effected via a stem 23 whose end is sealed after the evacuation.

Figure 3:
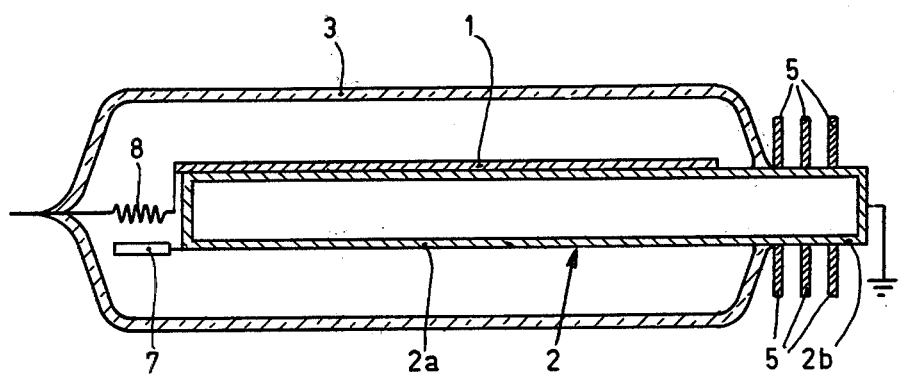
FIG. 3 is a longitudinal sectional view of a heat pipe solar collector in which the heating body which is powered by an external current source is connected electrically in series with a metal heat pipe.

The solar collector shown in FIG. 3 differs from that shown in FIG. 2 in that the heating body 8 and the metal absorber 1/tube 2 form an electrical series connection, the condenser 2b being earthed.

Figure 4A:
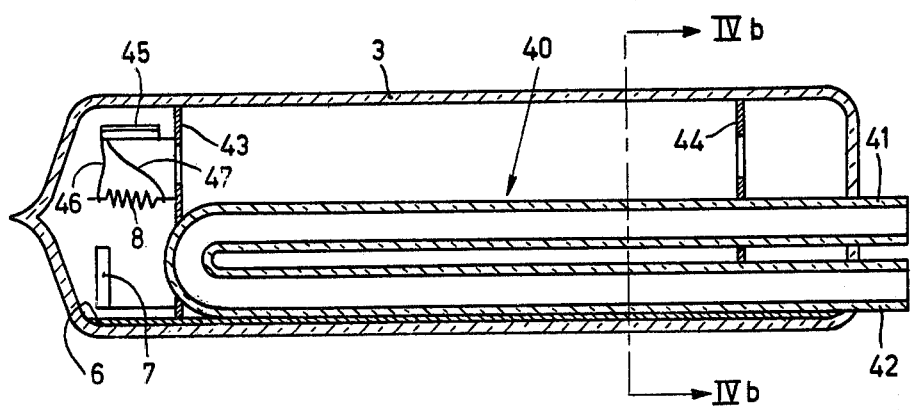
FIG. 4a is a longitudinal sectional view of a solar collector including an absorber in the form of a U-tube and a heating body which is powered by a photovoltaic cell (solar cell) which is also arranged in the evacuated envelope.
Figure 4B:
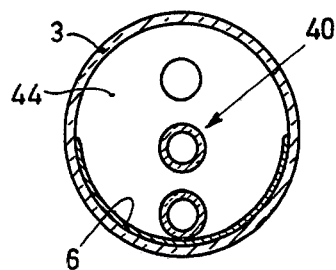

The solar collector shown in FIGS. 4a and 4b includes an absorber 40 in the form of a U-tube which has an inlet 41 and an outlet 42 for a heat transport medium, for example, water. The U-tube is made of, for example, glass and may be provided with a black surface layer of, for example, glass enamel.

The U-tube 40 is maintained in position inside the glass envelope 3 by means of plates 43 and 44 of, for example, mica.

Inside the evacuated glass envelope there is arranged a photovoltaic cell (solar cell) 45 which is connected to the heating body 8 via current conductors 46 and 47.

Solar radiation which is incident on the solar cell 45 during operation is converted into electrical energy whereby the operating temperature of the heating body 8 is raised to a value of from 800° to 900° C.

Obviously, the heat transport medium tube may also have a double-walled construction.

What is claimed is:

1. A solar collector which comprises an evacuated transparent envelope; an absorber arranged within said envelope; a duct arranged at least partially within said envelope and containing a heat-transport medium, said absorber being associated with said duct so as to transfer heat derived from incident solar radiation to the heat transport medium in said duct during operation; a getter positioned within the envelope; a heating element arranged within said envelope separate and apart from said getter; and means to heat said heating element to a temperature of 500° to 2000° C. in order to crack any hydrocarbons formed from gaseous contaminants released by said envelope and said absorber during operation.

2. A solar collector according to claim 1, in which the heating means comprises an arrangement for focussing and concentrating incident solar radiation onto the heating element.

3. A solar collector according to claim 1, in which the heating means comprises a source of electric current connected to said heating element.

4. A solar collector according to claim 3, in which the absorber is formed of metal and is connected in series with the heating element.

5. A solar collector according to claim 3, in which the electric current source comprises a photovoltaic cell arranged to receive solar radiation during operation.

6. A solar collector according to claim 5, in which the photovoltaic cell is positioned within the envelope.

* * * * *